United States Patent [19]

Van Steenburgh, Jr.

[11] Patent Number: 4,718,245
[45] Date of Patent: Jan. 12, 1988

[54] REFRIGERATION SYSTEM WITH BYPASS VALVES

[76] Inventor: Leon R. Van Steenburgh, Jr., 1900 S. Quince St., Unit G, Denver, Colo. 80231

[21] Appl. No.: 927,880

[22] Filed: Nov. 6, 1986

Related U.S. Application Data

[63] Continuation-in-part of Ser. No. 860,135, May 6, 1986, Pat. No. 4,689,969.

[51] Int. Cl.$^4$ .............................................. F25B 41/00
[52] U.S. Cl. ...................................... 62/196.4; 62/197; 62/200; 62/509
[58] Field of Search ................... 62/196.4, 197, 200, 62/509

[56] References Cited

U.S. PATENT DOCUMENTS

| | | | |
|---|---|---|---|
| 3,389,576 | 6/1968 | Mauer | 62/196.4 |
| 3,481,152 | 12/1969 | Seeley | 62/196.4 |
| 3,525,234 | 8/1970 | Widdowson | 62/151 |
| 3,555,842 | 1/1971 | Bodcher | 62/196.4 |
| 3,555,843 | 1/1971 | Cook | 62/196.4 |
| 4,023,377 | 5/1977 | Tomita | 62/196.4 |
| 4,136,528 | 1/1979 | Vogel et al. | 62/196.4 |
| 4,286,437 | 11/1981 | Abraham et al. | 62/509 X |

OTHER PUBLICATIONS

"Headstart" brochure, published circa 1982.
Wilkerson, "Refrigerated Air Dryers" published circa 1978.

*Primary Examiner*—Ronald C. Capossela
*Attorney, Agent, or Firm*—Ralph F. Crandell

[57] ABSTRACT

The refrigeration system includes a refrigerant reservoir, a condenser bypass valve of the gas pressure diaphragm type and a diaphragm-type hot gas bypass valve for supplying hot gaseous refrigerant directly from the compressor or refrigerant receiver to the evaporator, bypassing the expansion valve. The bypass valves may be hermetically housed in the refrigerant reservoir. The system is useful in a refrigerated gas separation apparatus such as a refrigerated dryer for compressed air, which includes a conditioner in the form of a shell and tube heat exchanger which cools incoming hot moist compressed air and warms outgoing cold dry air. The cooled moist gas is refrigerated by contact with a refrigeration system evaporator, in the form of a finned baffled coil, and the condensed moisture is removed in a moisture separator including a central conical baffle and peripheral longitudinal hooked scraper bars or baffles defining channels for collecting moisture and directing the liquid to a sump.

11 Claims, 17 Drawing Figures

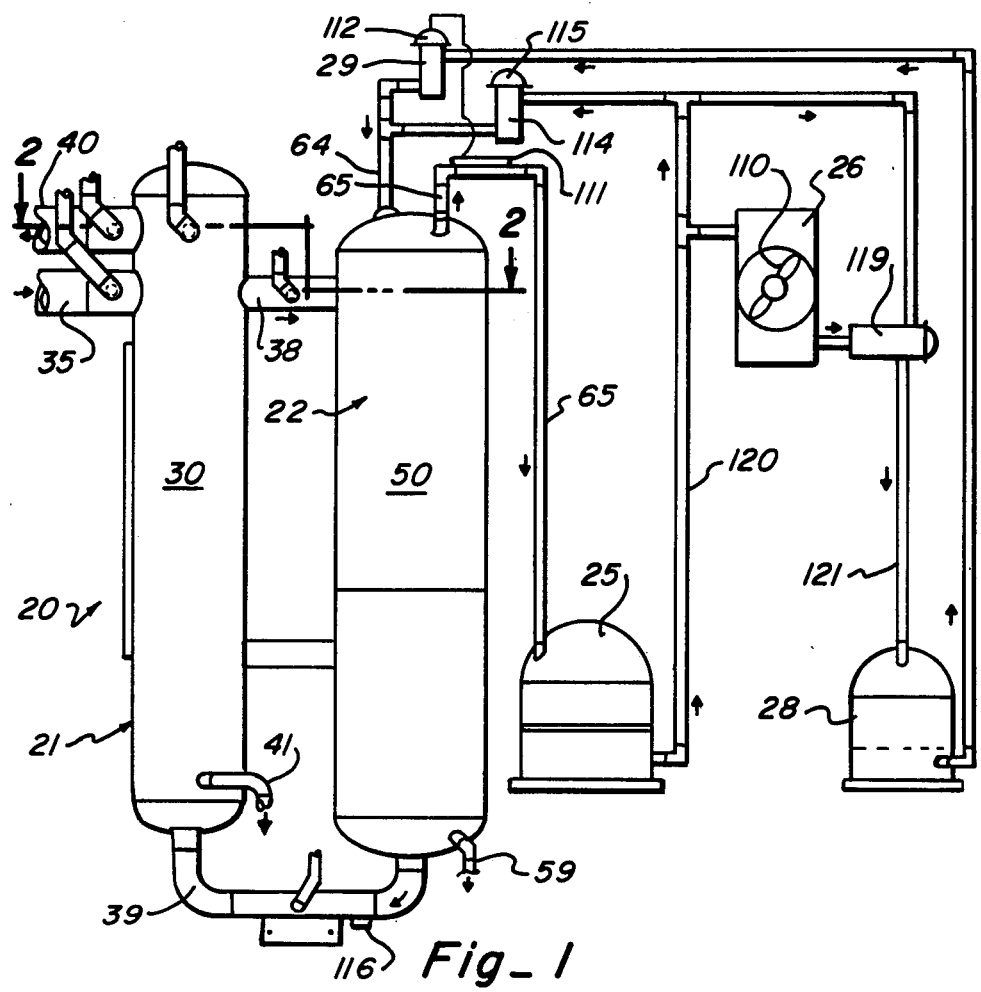
Fig_1
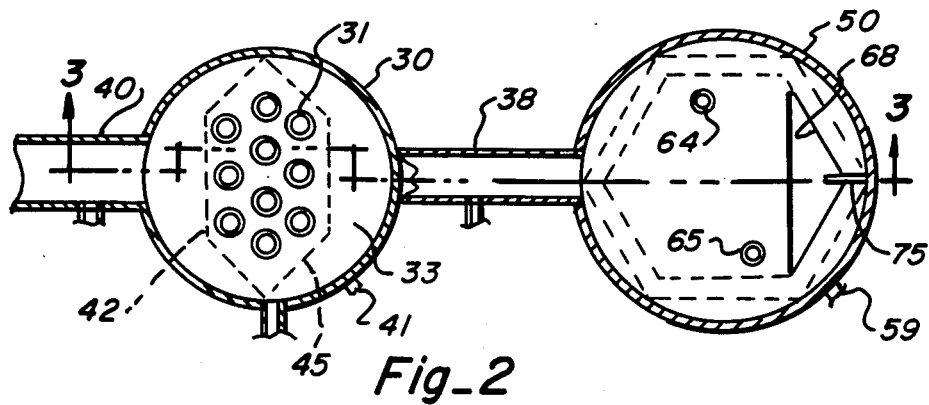
Fig_2

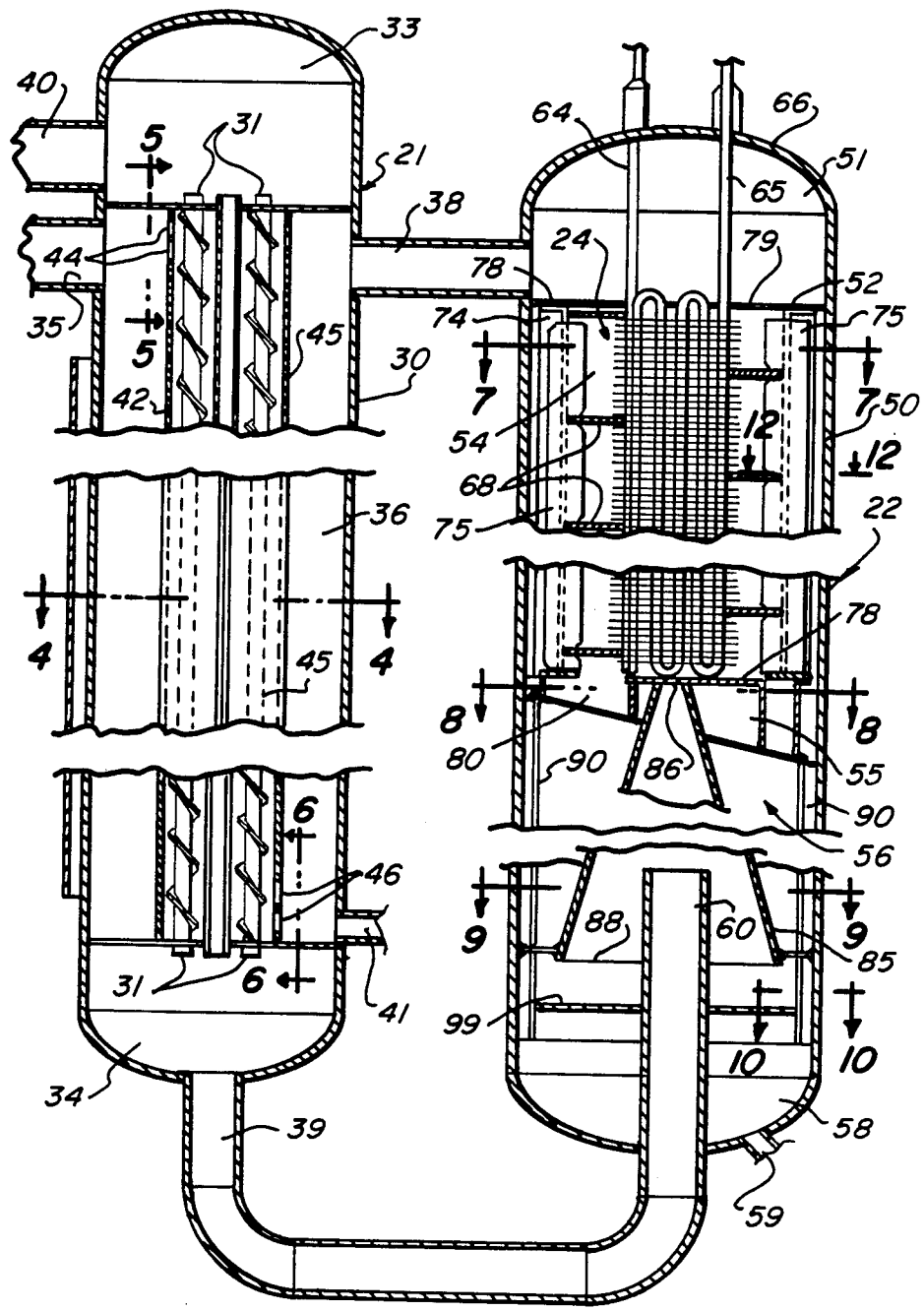
Fig_3

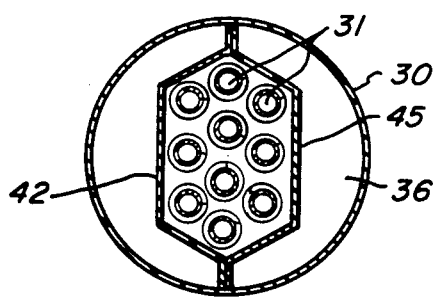
Fig_4
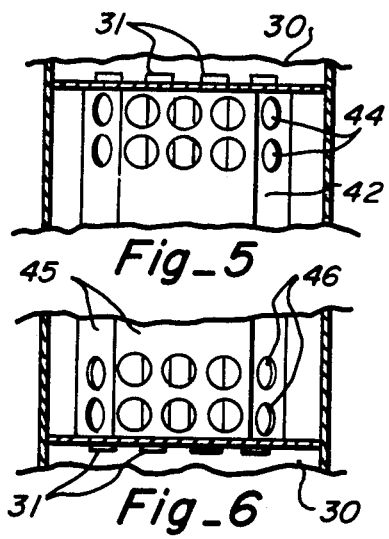
Fig_5
Fig_6
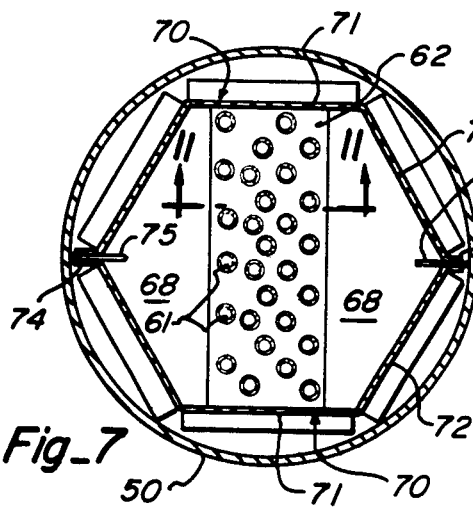
Fig_7
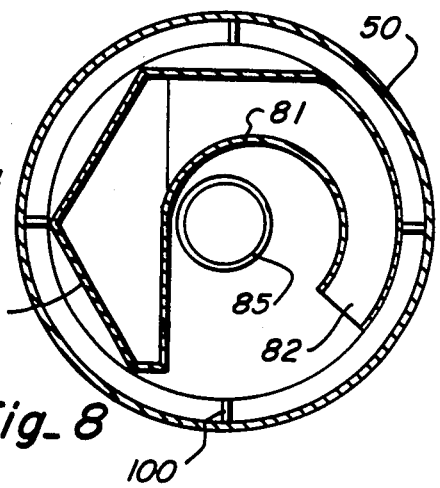
Fig_8
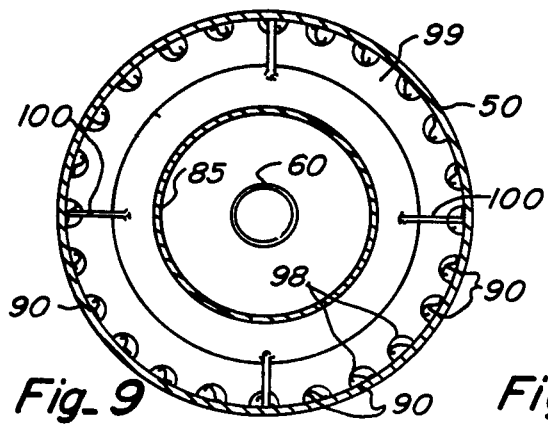
Fig_9
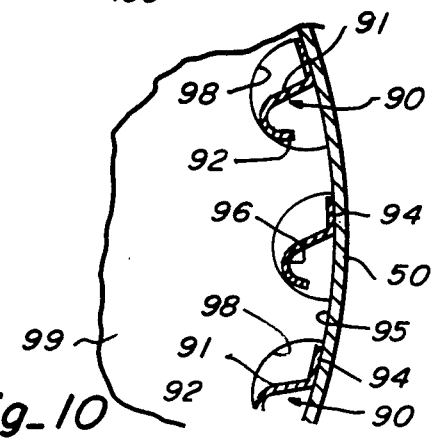
Fig_10

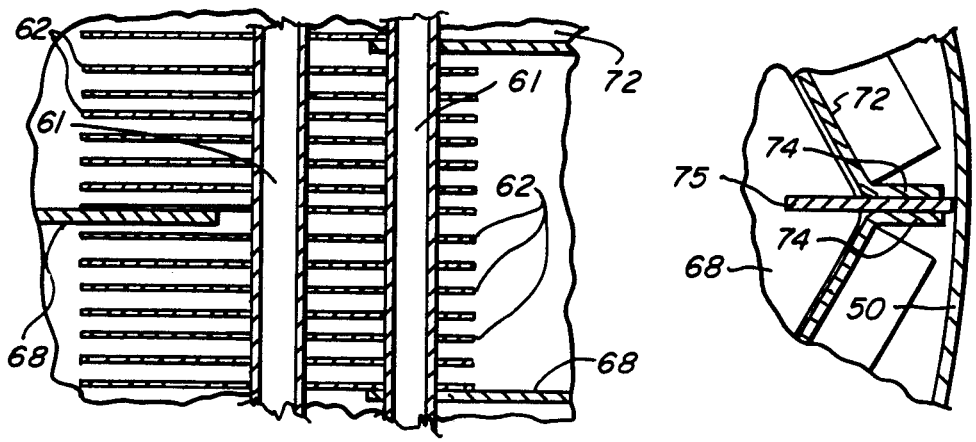
Fig_11   Fig_12
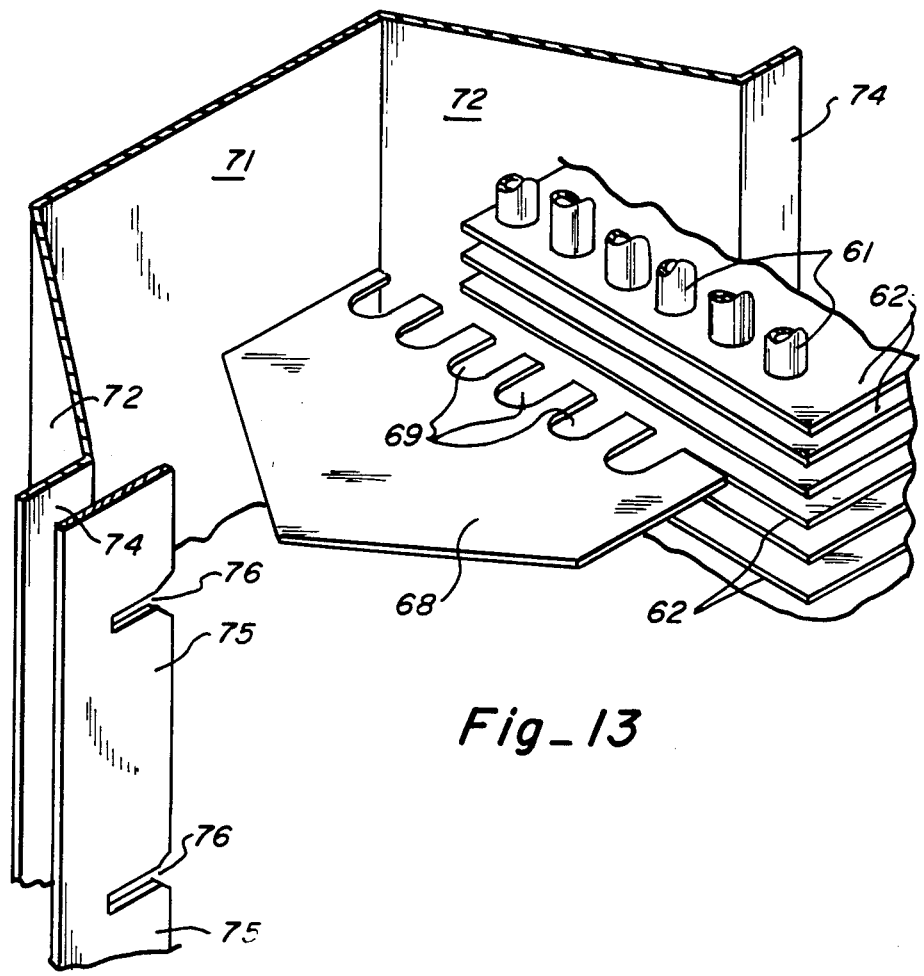
Fig_13

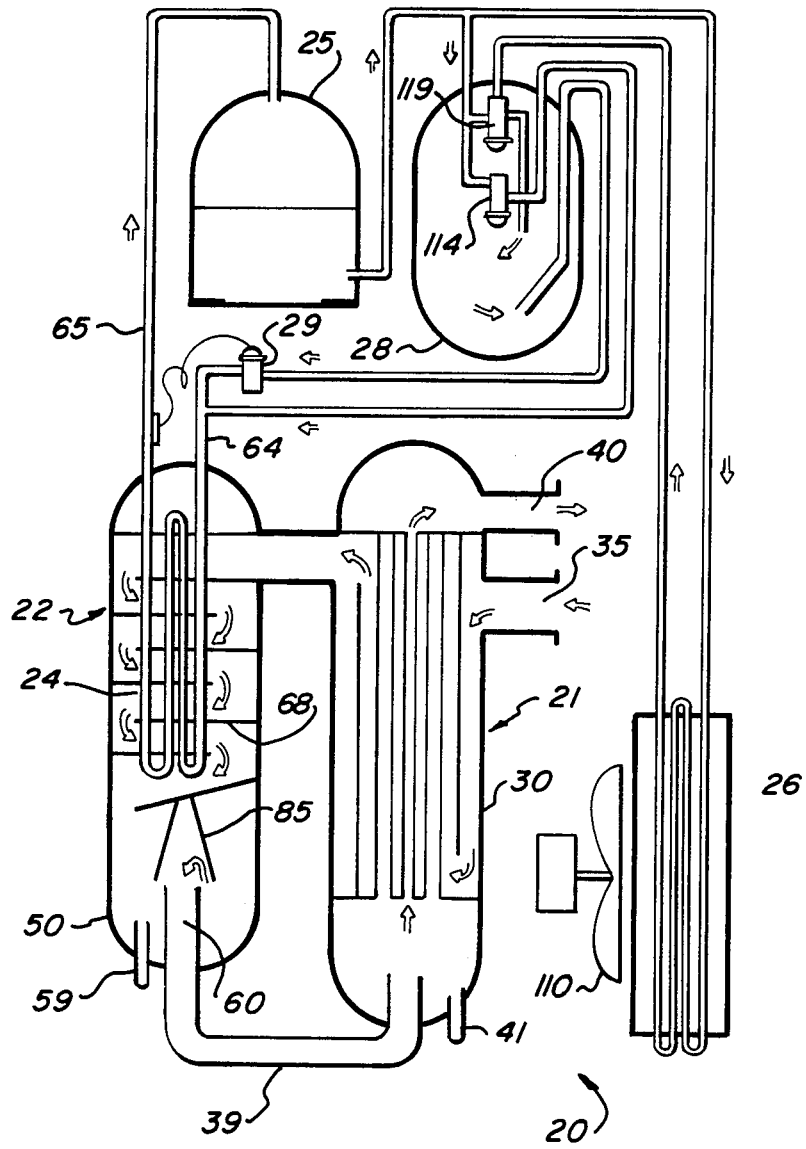
Fig_14

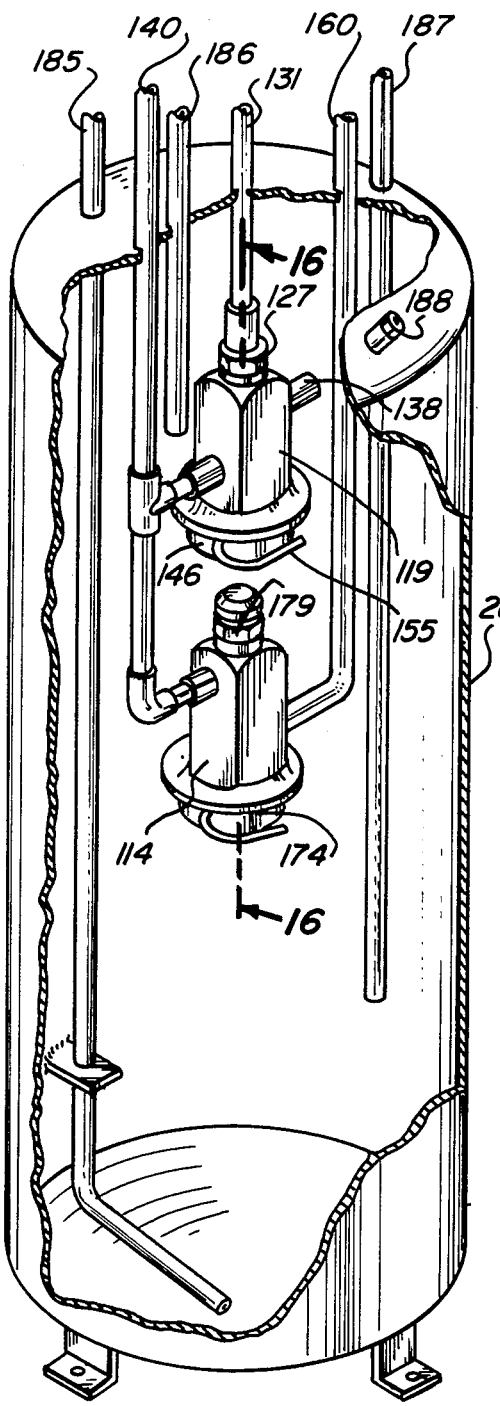
Fig_15
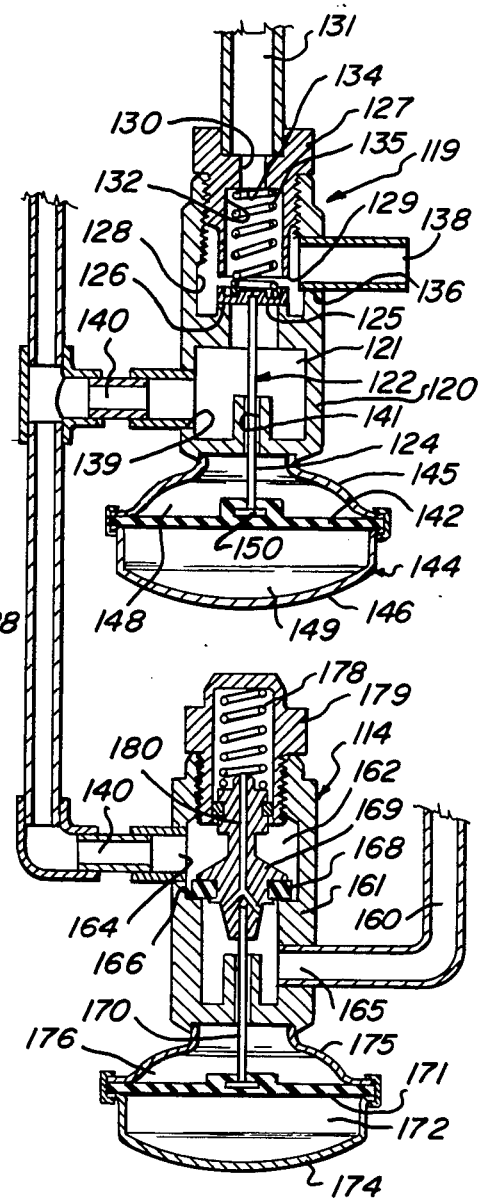
Fig_16

REFRIGERATION SYSTEM WITH BYPASS VALVES

CROSS-REFERENCE TO RELATED APPLICATION

This is a continuation-in-part of co-pending application Ser. No. 860,135, filed May 6, 1986 now U.S. Pat. No. 4,689,969, for "Refrigerated Gas Separation Apparatus."

BACKGROUND OF THE INVENTION

1 Field of the Invention

The present invention relates to refrigeration systems with a condenser bypass valve and a hot gas bypass valve, which system finds particular but not exclusive utility in connection with a refrigerated gas separation apparatus and, more particularly, refrigerated dryers and separators for removing moisture from compressed air.

2 Prior Art

Refrigerated dryers and moisture separators for removing moisture from compressed air are generally old and well-known in the art. Such apparatus conventionally includes a conditioner or equalizer in the form of a shell and tube heat exchanger for cooling incoming hot, moist compressed air and warming outgoing cold, dried compressed air. The cooled, moist compressed air is then contacted with a refrigeration evaporator which further lowers the temperature of the compressed air, thereby causing moisture to condense for removal in a separator. Condensed moisture is removed and the cold, relatively drier compressed air is directed through the equalizer heat exchanger to cool incoming hot, moist compressed air before being discharged to the utility circuit.

The refrigeration evaporator is part of a conventional refrigeration circuit, including a refrigerant compressor, condenser, refrigerant reservoir, expansion valve or orifice, and evaporator.

A refrigerating system having a remote condenser subject to low ambient temperatures is shown and described in previously filed application Ser. No. 376,921, filed May 10, 1982, now abandoned. The disclosure of said application Ser. No. 376,921 is incorporated by reference herein and made a part hereof.

The refrigeration circuit shown in application Ser. No. 376,921 is an electromechanical refrigerating system which includes a receiver located close to the compressor and also as close to the evaporator as possible. The receiver acts as a reservoir with a volume capacity corresponding to that of both the evaporator and condenser. During periods of low condenser ambient temperature, the refrigerant liquefies near the start of the condenser coil and the condenser is full of liquid refrigerant. During periods of high condenser ambient temperature, the refrigerant does not cool and liquefy until near the end of the condenser coil and, because the gaseous refrigerant occupies a much greater volume than the liquid refrigerant, a reservoir such as the receiver is required for the remaining refrigerant.

When the condenser ambient temperature is very low, with correspondingly low refrigerant temperatures, the pressure and temperature drop across the thermostatic expansion valve are too low for effective operation of that valve. This problem is overcome with a condenser bypass valve which directs hot gaseous refrigerant directly into the receiver from the compressor, bypassing the condenser in the event the pressure of the liquid from the condenser falls below a predetermined level, as measured by the pressure differential between the gaseous compressor refrigerant and the liquid condenser refrigerant. The hot gaseous refrigerant discharged from the condenser bypass valve into the receiver quickly raises the temperature of the receiver refrigerant before it is routed to the thermostatic expansion valve.

Such a system is particularly useful during initial start-up under cold temperature conditions. The condenser bypass valve gradually throttles down the hot gas bypass as the evaporator adds heat to the system. Eventually, the condenser and other components approach normal operating temperatures and pressures, and no hot gas bypass is required.

OBJECTS AND SUMMARY OF THE INVENTION

An object of the present invention is to provide an improved refrigeration control circuit which both facilitates start-up and operation of the refrigeration system when the condenser and receiver are subjected to unusually low temperatures.

Another object of the present invention is to provide for operation of the system on low compressed air flow while preventing freeze-up of the evaporator.

Still another object of the present invention is to provide an improved refrigerated gas separation apparatus, and more particularly an improved refrigerated dryer for removing moisture from compressed air.

A further object of the present invention is to provide a refrigeration system in which a compressor bypass valve and the hot gas bypass valve to the evaporator are both hermetically housed within the refrigerant receiver in order to maintain said valves at the temperature and pressure within the receiver.

A related object of the present invention is to provide an improved refrigerant control circuit for controlling the temperature of the evaporator and thereby the temperature of the gas being dried.

A further related object of the present invention is to provide an improved refrigerant receiver and control valves housed therein.

Other objects and advantages of the present invention will become apparent from the following description and accompanying drawings.

The present invention is embodied in a compressed gas dryer assembly in which warm, moist compressed air flows into a shell and tube heat exchanger or conditioner in heat exchange relation with an output stream of cold, dry air to produce an output of warm, dried air. The incoming moist, warm air is cooled and flows to a refrigerating and moisture separation unit wherein the moist air is cooled to effect moisture separation. Moisture, in the form of liquid droplets, is separated from the cold air in the separator section, the collected liquid being drained through an appropriate outlet, and the cold, relatively dry air flows back to the conditioner in heat exchange relation with the incoming moist, warm compressed air.

The refrigeration apparatus may be a conventional liquid refrigerant type apparatus, including a compressor, a condenser, a receiver and an evaporator. Refrigerant is compressed by the compressor, condensed in the condenser and collects in the collector or receiver. From the receiver, the refrigerant flows through an expansion valve or orifice to the evaporator for cooling purposes. The warmer refrigerant from the evaporator is again compressed and the cycle repeated. Bypass valves are provided for bypassing the condenser and for controlling the temperature of the evaporator and thereby of the material being cooled. The bypass valves are hermetically sealed within the refrigerant receiver in order to maintain said valves at a relatively constant temperature and pressure.

The improved evaporator construction embodying the present invention is in the form of a finned coil, generally rectangular in cross-section, with inserted transverse baffles to provide a transversely tortuous path for air or other gaseous material flowing through the evaporator. The baffled, finned coil is housed in an internal, generally hexagonal shell, which in turn is mounted in a vertical cylindrical housing. The evaporator is located in the upper section and a moisture separator in the lower section of the cylindrical housing. From the evaporator cooler, the air flows downwardly in a generally tangential spiral path through the moisture separator where it is contacted by a plurality of scraper bars or radial baffles to effect removal of liquid from the cooled gas. A conical internal baffle provides an increasingly smaller diameter spiral path to further effect removal of the liquid from the cooled gas.

Collected liquid is drained from the bottom of the cylindrical tank or housing, while the cold, dried gas flows upwardly centrally of the conical baffle and outwardly through an outlet conduit to the shell and tube conditioner.

Appropriate controls may be provided for the refrigeration equipment by measuring temperatures and pressures throughout the apparatus. Because of the complexity of the control parameters, the system is ideally suited for microprocessor control.

DESCRIPTION OF THE DRAWINGS

FIG. 1 is an elevation view, partially schematic, of a refrigerated air dryer embodying the present invention.

FIG. 2 is an enlarged section view taken substantially in the plane of line 2—2 on FIG. 1.

FIG. 3 is a further enlarged section view taken substantially in the plane of line 3—3 on FIG. 2 and showing the conditioner heat exchange apparatus and the refrigeration and moisture separator apparatus embodying the present invention.

FIG. 4 is a section view taken substantially in the plane of line 4—4 on FIG. 3.

FIG. 5 is a section view taken substantially in the plane of line 5—5 on FIG. 3.

FIG. 6 is a section view taken substantially in the plane of line 6—6 on FIG. 3.

FIG. 7 is a section view taken substantially in the plane of line 7—7 on FIG. 3.

FIG. 8 is a section view taken substantially in the plane of line 8—8 on FIG. 3.

FIG. 9 is a section view taken substantially in the plane of line 9—9 on FIG. 3.

FIG. 10 is an enlarged section view taken substantially in the plane of line 10—10 on FIG. 3.

FIG. 11 is an enlarged section view taken substantially in the plane of line 11—11 on FIG. 7.

FIG. 12 is an enlarged section view taken substantially in the plane of line 12—12 on FIG. 3.

FIG. 13 is an enlarged isometric exploded view of the refrigeration evaporator finned coil and baffle assembly shown in FIG. 3.

FIG. 14 is a schematic diagram of the apparatus embodying the present invention.

FIG. 15 is an enlarged isometric view, partly cutaway, of the reservoir and contained valves shown in FIG. 14.

FIG. 16 is a further enlarged section view taken substantially in the plane of line 16—16 on FIG. 15, and showing the bypass valves in cross-section.

DESCRIPTION OF THE PREFERRED EMBODIMENT

Figure 17:
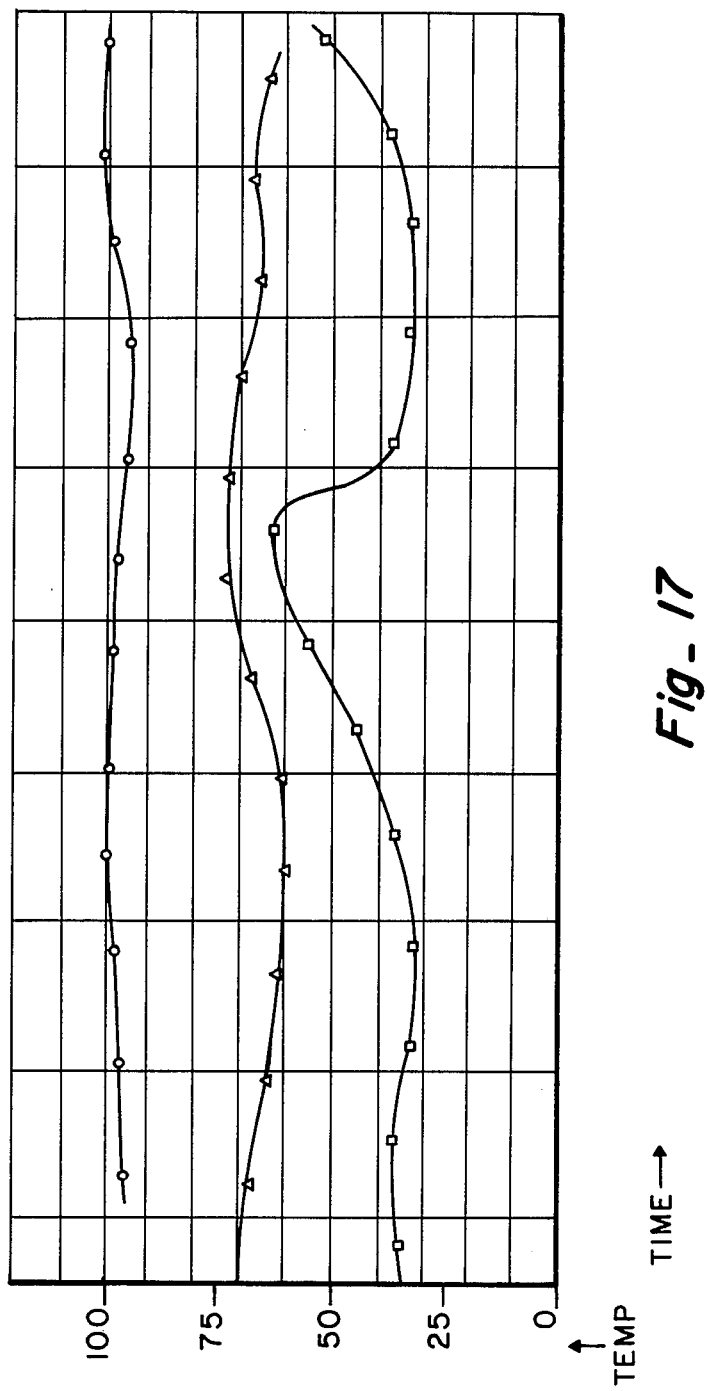
FIG. 17 is a chart showing the temperature changes of various points in the apparatus in the course of an experimental test.

Referring to the drawings, and particularly FIGS. 1, 3 and 14, the present invention is embodied in a refrigerated gas-liquid separation apparatus 20 such as a refrigerated dryer for compressed air. The apparatus includes a shell and tube type heat exchanger or conditioner 21 for conditioning incoming moist, warm air by heat exchange with cold, relatively drier air prior to discharge of the dry air to the system or point of use thereof. The relatively cooled, moist air is further cooled and dried in a refrigeration evaporator and moisture separator unit 22 wherein the air is cooled and dried and liquid water is removed from the system. A refrigeration system includes the evaporator 24 which forms a part of a refrigeration system including a compressor 25, a condenser 26, a refrigerant collector or receiver 28, and an expansion valve or orifice 29, in series with the evaporator 24. The refrigeration system provides a refrigerated evaporator or heat exchanger for controllably chilling incoming moist air to effect the removal of moisture therefrom, thereby drying the compressed air. While particular reference will be made to the drying of compressed air in connection with the description of the present apparatus, it should be understood that the apparatus is equally useful for the separation of gases or the removal of liquids from gases by chilling or cooling the gas to effect condensation and separation of a component thereof.

Turning first to the heat exchanger or conditioner 21, shown in detail in FIG. 3, the heat exchanger is a conventional shell and tube type heat exchanger formed by a cylindrical housing or shell 30 with a plurality of internal tubes 31 opening into end chambers 33 and 34, respectively. Incoming hot, moist compressed air flows through inlet port 35 into the shell in surrounding relation with the tubes 31. The air flows longitudinally along and around the tubes 31, into an outlet chamber 36 and outlet conduit 38. The incoming air flows in heat exchange relation with cold, relatively drier gas flowing through the inlet conduit 39 and inlet chamber 34, into and through the tubes 31 to the outlet chamber 33, and thence through the outlet 40 to the point of use. The heat exchanger tubes 31 may have any desired surface configuration, such as the spiral configuration illustrated in FIG. 3 in order to enhance the heat transfer relationship between the relatively cold air flowing through the tubes and the relatively warmer air flowing through the shell. Moisture collected in the shell portion of the conditioner is discharged through an appropriate discharge port 41 which may, if desired, be under the control of an outlet valve (not shown). The shell and tube heat exchanger 21 is provided with appropriate longitudinal baffles, including an inlet baffle 42 having inlet ports 44 for directing the warm, moist air to the vicinity of the tubes, and an outlet baffle 45 having outlet ports 46 through which air flows from contact with the tubes 31 into the outlet chamber 36.

Relatively cooler, moist air flows through the outlet conduit 38 to the refrigeration cooler and moisture separator unit 22 wherein the moist air is supercooled to effect the removal of moisture therefrom. The moisture is removed by condensation and collected for discharge. The relatively supercooled dry air flows through conduit 39 into the shell section of the shell and tube conditioner as described above.

The refrigerated cooler and moisture separator unit 22 is defined by a generally cylindrical housing 50 having an upper air inlet section 51 defined by the upper end of the cylinder 50 and an internal partition or baffle 52, into which section 51 cold, moist air flows from the conditioner outlet conduit 38.

Below the inlet section 51 there is defined a cooling section 54 in which is located a refrigerant system evaporator 24. Through an appropriate baffle arrangement, the moist air traverses the evaporator 24 and is thereby superchilled to effect the removal of moisture therefrom. The cooled, moisture-laden air then flows through a transition section 55 in which it is directed in a generally spiral, tangential path into the moisture separator 56 in which moisture is removed from the supercooled air and flows to a sump 58 defined in the lower end of the housing 50. The collected moisture is removed from the sump 58 through a discharge conduit 59. Discharge of liquid from the unit through the discharge conduit 59 may be under the control of an appropriate valve (not shown). From the separator 56, cold, dry air is removed through an outlet conduit 60 connected to the discharge conduit 39, through which it is introduced into the tube section of the conditioner 21.

The refrigeration evaporator unit 24, mounted in the cooling section 54, comprises a generally rectangular, finned refrigerant coil formed by a multipass refrigerant conduit 61 and a plurality of fins 62 formed of thin metal sheet integrally fastened to the coil tubes 61. The refrigerant coil has a refrigerant inlet conduit 64 and an outlet conduit 65 both of which extend through the upper end wall 66 of the cylindrical housing 50. The fins 62 being in heat exchange contact with the coiled refrigerant tubes 61, provide a large area for heat exchange relationship with the incoming air.

In order to direct the incoming air across the fins 62 in a generally transverse zig-zag path, a plurality of spaced baffles 68 are inserted at selectively spaced points between the fins. The baffles 68 are provided with notches 69 for receiving corresponding refrigerant tubes 61 when the baffles 68 are inserted in place between the fins, as shown in FIGS. 3, 7 and 13.

At their outer edges, the baffles 68 are generally triangular or gabled in configuration to provide, when inserted within the generally rectangular finned coil, a hexagonal configuration as shown in FIG. 7. The coil and inserted baffles are housed within an internal, generally hexagonal, housing formed by a pair of three-sided housing panels 70, each such housing panel having a base panel 71 with a pair of adjoining, sloping side panels 72, each terminating in an outwardly directed sealing fin or strip 74. When two such housing panels are placed together surrounding the finned and baffled coil with their respective sealing fins or strips in juxtaposed relation, a generally hexagonal housing is produced.

For supporting the baffles, a notched sealing strip 75 having appropriate notches 76 for receiving an inserted edge of a baffle 68, are positioned between the juxtaposed longitudinal sealing fins or strips 74. When so assembled, the units are welded together by spot welding or otherwise securing the housing units with their sealing fins or strips 74 adjacent the insert strips 75. The entire assembled hexagonal housing can then be readily inserted within the cylindrical housing 50 and sealed therein by the use of appropriate circular panels 78 at each end thereof, as shown in FIG. 3.

An inlet passage 79 is provided at the upper end of the finned coil and baffle assembly, while an outlet passage 80 is provided at the lower end. Also at the lower end of the assembly there is provided a sheet metal conduit or horn as shown in FIG. 8 providing a generally tangential outlet path or passage 82 for directing the flow of air tangentially into the separator section in a generally spiral path.

For maintaining the air flow in a generally spiral path through a successively narrowing annular passage, there is provided a central conical baffle 85 positioned axially within the separator section and extending from an apex end 86 adjacent the cooling unit to a base end 88 adjacent the moisture sump 58. The outlet conduit 60 extends axially upwardly within the conical baffle 85, through the base end thereof, as shown in FIG. 3, to prevent the entrainment of liquid into the cold, dried outlet gas.

For effecting efficient removal of liquid from the spirally flowing cold gas, a plurality of longitudinally extending peripherally mounted scraper blades 90 are secured to the internal surface of the moisture separator section 56 of the housing 50, the scraper blades 90 being generally coextensive in length with the central conical baffle 85. Referring to FIGS. 9 and 10, the scraper blades 90 comprise an elongated strip which is hooked in cross-section, defining a radially inwardly extending leg 91, terminating at its innermost end in a reverse hook 92. At the opposite end from the hook, the blade is formed with a mounting leg 94 which is adapted to be secured to the internal surface 95 of the housing wall 50. The hook extends towards the direction of air flow, and thereby provides a turbulent area with a contained channel 96 for collecting moisture from the swirling air. Moisture runs down the channel 96 through an arcuate opening 98 in the peripheral edge of a bottom panel 99 separating the moisture removal section from the moisture sump, as shown in FIGS. 9 and 10. Adjacent its lower end, the central conical baffle 85 is secured to the wall of the housing 50 by appropriate braces 100.

As can be observed from the foregoing, incoming cool, moisture-laden air flows through inlet passage 38 into the inlet chamber 51 of the housing 50, and thence in a zig-zag path through the baffled refrigeration evaporator finned coil, wherein the gas is cooled to effect condensation of moisture or other component therefrom. From the evaporator cooler, the moistureladen gas flows through the outlet 82 of the spiral or horn shaped channel 81 tangentially into the separator section where it flows in a continuous turbulent, spiral path defined by the central conical baffle 85 and impinges on the scraper blades 90 to effect the efficient removal from the gas of moisture or other condensable component. As the moisture condenses, it flows into the sump 58 for removal through the outlet port 59, while the dried, supercooled gas flows upwardly internally of the conical baffle and then outwardly through the outlet port 60 and through conduit 39 to the conditioner or shell and tube heat exchanger for conditioning the incoming warm, moist air.

The refrigeration circuit is shown in alternative forms in FIGS. 1 and 14. The refrigeration circuit itself is basically a conventional circuit including the evaporator 24 described above, in series with the compressor 25, condenser 26, receiver 28, and expansion valve 29, preceding the evaporator 24. The condenser may include a cooling fan 110. The orifice or expansion valve 29 is controlled generally according to the temperature of the refrigerant in the outlet conduit 65 from the evaporator, by means of a thermostat 111 secured to the outlet line 65 and controlling a valve operator 112 on the expansion valve.

To facilitate start-up and operation under low ambient temperatures, a condenser bypass valve 119 directs the flow of refrigerant from the compressor outlet line 120 directly to the receiver through the condenser output line 121, bypassing the condenser 26. In addition, hot gas bypass valve 114 allows gaseous refrigerant at a high temperature and pressure to flow directly to the evaporator inlet, bypassing the expansion valve 29 when the temperature and pressure in the evaporator are below a predetermined level. This lowpressure evaporator condition would prevail, for example, when the gas flow across the evaporator is low, thereby allowing the evaporator to become excessively cold with an imminent danger of freezing or frosting. Such a low flow condition could prevail, for example, when the dried, compressed gas storage is full and the dried, compressed gas is not being fully utilized. The pneumatic pressure on the hot gas bypass valve may be stabilized by the temperature of the output air, using a bulb 116 in operative, functional relationship to the cold air outlet conduit 39.

The bypass valves are pressurized diaphragm biased disk valves, and each includes a pressure dome and diaphragm operator. The pressure dome defines a chamber closed by a flexible diaphragm. An adjusted gas pressure is established and maintained in the dome chamber, in opposition to a coil spring or other mechanical biasing device, to provide a constant, predetermined differential biasing force on the valve at a given temperature. In order to maintain the gas in the dome at a relatively constant pressure, it is necessary to maintain the gas at a relatively constant temperature. It has been observed, for example, that for every 7° F. change, or 3.9° C., in ambient temperature, the differential pressure force in the valve changes by one pound or 2.2 kg. Accordingly, applicant has discovered that these valves are desirably placed and hermetically sealed in the receiver 28 as shown in the alternative configuration of FIGS. 14 and 15. With such a construction, there is no requirement that the valves be adjustable to compensate for dome temperature variations. Any slight dome temperature variations tend to be self correcting as a result of the operation of the condenser bypass valve as described below.

The reservoir and enclosed valves are shown more particularly and in detail in FIGS. 14, 15 and 16. As shown in FIGS. 14 and 15, the reservoir 28 encloses a first or condenser bypass valve 119, as shown in FIG. 16, which is a three-way valve for supplying refrigerant to the receiver 28, either from the condenser 26 or directly from the compressor 25, bypassing the condenser 26. When the pressure in the receiver is low, the valve shifts to provide for the flow of gaseous refrigerant at a high temperature and pressure from the compresser directly to the receiver.

The condenser bypass valve 119, a three-way valve for supplying refrigerant to the receiver 28 either from the condenser 26 or directly from the compressor 25, is shown in FIG. 16 and comprises a valve body 120 defining a valve cavity 121 enclosing a valve poppet 122 having a stem 124 and head or disk 125. The valve body defines a seat 126 in the valve cavity 121 against which the stem side or surface of the poppet valve head 125 is adapted to seat. The body further defines a threaded counterbore 128 in which there is inserted an inlet nozzle 127 defining a second seat 129 opposed to the valve body seat 126 and also adapted to sealingly receive the top or outer surface of the poppet valve head 125. The nozzle is provided with an inner bore 130 which serves as the inlet port from a conduit 131 from the refrigerant system condenser. A counterbore 132 in the inlet nozzle 127 defines a shoulder 134 supporting a biasing spring 135 acting between the shoulder 134 and the poppet valve head or disk 125. The biasing spring 135 urges the poppet valve head against the valve body seat 126 to open the passage between the nozzle seat 129 and the poppet disk 125 to allow the flow of condensed refrigerant from the condensor through an outlet port 136 from the valve cavity 121 and through an outlet conduit 138 into the receiver 28. An inlet port 139 is defined in the valve cavity 121 opening into a conduit 140 from the discharge side of the refrigerant compressor 25 for introducing hot, pressurized refrigerant gas directly from the compressor 25 into the valve cavity 121 and thence into the receiver 28 when the poppet valve 122 is opened with respect to the internal valve seat 126.

The valve stem 124 is slidably supported in a bore 141 through the valve body and opening at the end thereof opposite the valve nozzle 127. The valve body is sealed at the stem opening by a diaphragm 142 housed within a diaphragm chamber 144. The diaphragm chamber 144 includes an annular cupped disk 145 sealed to the valve body 120 surrounding the stem bore 141 and to a cup-shaped dome 146 with the diaphragm extending between the annular disk 145 and the dome 146. The diaphragm defines an inner chamber 148 adjacent to the valve body 120 and communicating with the valve cavity 121 and an outer pressure chamber 149. The diaphragm 142 engages a stem plate 150 on the free end of the stem 124 of the poppet valve 122.

A fill tube 155, shown in FIG. 15, may be utilized to provide a pressure fluid to the interior of the diaphragm pressure chamber 149 defined by the dome 146 and diaphragm 142. The pressure in the dome chamber 149 is adjusted to provide the desired force on the poppet valve 122 in opposition to the biasing spring 135 and the compressor discharge pressure in the valve chamber 121.

In operation, when the pressure in the receiver 28 and the compressor discharge line 140 is sufficient to act on the diaphragm 142 in cooperation with the biasing spring 135 to close the poppet valve disk 125 against the valve seat 126, condensed liquid refrigerant flows from the condenser through the inlet conduit 131 and valve nozzle 130 to the outlet conduit 138 and into the receiver. The compressor pressure, together with the spring pressure of the valve spring 135 acting against the fluid pressure in the dome chamber 149, holds the poppet valve against the internal valve seat 126. When the pressure of the receiver and condenser drops sufficiently, the pressure in the dome chamber 149 overcomes the receiver and condenser pressure and the compressor discharge pressure, to move the valve poppet 122 away from the internal valve seat 126 and allow hot pressurized refrigerant gas to flow directly from the compressor 25 into the receiver 28 in order to pressurize the receiver. The receiver pressure can drop, for example, when the surrounding temperature falls to a sufficiently low level or the amount of liquid in the receiver drops to an undesirably low level, thereby causing the receiver pressure to drop sufficiently below the required operating pressure for the refrigerant expansion valve.

Discharge of hot pressurized gas directly from the compressor into the receiver serves to pressurize the receiver 28 back to normal operating pressure and temperature. When receiver pressure builds up to the desired level, the diaphragm-operated poppet valve disk 125 again closes against the valve seat 126, allowing liquid again to flow from the condenser 26 the receiver 28.

By maintaining the proper operating pressure in the receiver 28 and in the expansion valve 29, the condenser bypass valve 119 also maintains the proper dome temperature (and thus, pressure) in both bypass valves. Therefore, the single arrangement described herein serves both to correct pressure variations on the expansion valve and temperature variations in the valve domes.

A second or hot gas bypass valve 114 is utilized to supply hot gas directly from the compressor 25 to the evaporator during low-flow conditions of the air flow being dried, in order to prevent freeze-up of the evaporator 24. The use of a hot gas bypass valve is well known in the art, and such valves have been utilized to supply hot gas from a compressor either to the inlet side or the outlet side of the evaporator.

The hot gas bypass valve 114 is similar in construction to the condenser bypass valve, and is likewise contained within the refrigerant receiver 28 as shown in FIGS. 15 and 16. The valve 114, when open, allows hot, compressed refrigerant gas to flow from the compressor 25 through line 140 to feedline 160 to the evaporator inlet line 64 or outlet line 65, thereby warming the evaporator and preventing freeze-up thereof.

The hot gas bypass valve 114 is a pressure-diaphragm actuated poppet valve formed by a body 161 defining a valve chamber 162 with an inlet port 164 connected to the hot gas refrigerant line 140, and an outlet port 165 opening to the feedline 160 to the evaporator 24. A valve seat 166 is defined in the valve chamber 162 for cooperating with a poppet valve disk 168 of a poppet valve 169 having a valve stem 170 slidably supporting the poppet in the valve body 161. The poppet 169 is biased in the open direction by a pressure-actuated diaphragm 171 closing a pressure chamber 172 formed by a cup-shaped disk or dome 174 sealingly secured to an annular cup-shaped base 175. The base is sealingly secured to the valve body 161 and provides an inner chamber 176 communicating with the valve chamber 162. The latter contains refrigerant pressure corresponding to the pressure in the evaporator. The valve poppet 169 is biased in the opposite direction by a biasing spring 178 housed within a valve cap 179 and acting against the opposite end of the poppet 169. The poppet is sealed in the spring chamber and a central passage 180 through the valve poppet from the outlet side thereof provides a balancing pressure force also corresponding to the pressure in the evaporator.

When the pressure in the evaporator 24 drops below a predetermined amount, the biasing differential between the diaphragm pressure, as determined by the pressure in the dome chamber 172, and the pressure of the biasing spring 178, opens the poppet 169, moving the disk 168 away from the valve seat 166 and allowing hot gas to flow from the compressor 26 through the compressor outlet line 140 to the evaporator feedline 160 and thence to the evaporator 24.

FIG. 17 shows the refrigerant temperature at various locations in the system in the course of an experimental test of the condenser bypass valve. The temperature of the condenser discharge varies over nearly 20° F. (11° C.) corresponding to variations in the ambient temperature around the condenser and variations in the temperature of the refrigerant input to the condenser. Variations in the input temperature correspond, in turn, with variations in the temperature of the evaporator discharge and the evaporator load. The evaporator load and the temperature of the evaporator discharge shows a peak approximately half-way through the experiment. The condenser discharge shows a corresponding peak, with a delay to account for the time it takes for the refrigerant to move from the evaporator through the compressor and condenser. Under prior art systems, this variable temperature condenser discharge would be routed to the thermostatic expansion valve, where it would produce wide variances in valve performance. The valve arrangement of this invention avoids those temperature and pressure variances at the thermostatic expansion valve. The condenser bypass valve mixes hot gases from the compressor with the condenser to maintain the receiver refrigerant at a temperature of 95° to 100° F. (35-38° C.) as shown in FIG. 17. Thus, the thermostatic expansion valve is kept at a constant pressure and temperature for ideal performance.

Moreover, both valves are placed inside the constant temperature receiver. This assures a constant dome pressure in each valve by insulating the valve from the temperature variations elsewhere in the system. Placing either valve outside the receiver would cause the valve operation to change with temperature changes, thereby disrupting the system equilibrium.

As an alternative system (not shown), the compressor discharge line 140 shown in FIG. 15 may end at the inlet port 139 to the condenser bypass valve 119, and the inlet port 164 of the hot gas bypass valve 114 may be open directly to the interior of the reservoir 28. The hot gas supplied to the evaporator 24 in the latter case is the somewhat cooler vapor from the reservoir 28 instead of the hotter pressurized gas from the compressor 25. Larger capacity refrigeration systems conventionally utilize the refrigerant vapor from the reservoir or receiver, while smaller capacity systems conventionally utilize the hot gas directly from the compressor.

Both bypass valves 114 and 119 are of the balanced poppet type, with a differential pressure biasing force being applied to the poppet disk. This force can be accurately established once the valves have been assembled by applying a static pressure to the valve and then filling the pressure chamber 149 or 172 with an amount of pressure fluid sufficient to balance the opposing spring force exerted by the coil springs, 135 or 178. It should be appreciated that while the spring rates can never be exactly accurate, an accurate amount of pressure fluid can be applied within the diaphragm chamber.

Referring to FIG. 15, it will be noted that the receiver also includes an outlet line 185 through which refrigerant flows from the receiver 28 to the thermal expansion valve 29 and thence to the evaporator 24. Level inspection tubes 186 and 187 are also desirably provided for determining the high and low levels of refrigerant in the receiver, should the need become necessary. A fill port 188 is also provided for adding refrigerant to the receiver.

Refrigerated gas separation apparatus of the foregoing character, such as dryers for compressed air, may include various monitoring displays. Monitors may be provided to display ambient air temperature, refrigerant compressor discharge temperature, evaporator refrigerant temperature, inlet air pressure, outlet air pressure, and outlet air temperature. Air flow through the unit may be monitored and displayed directly or as a percentage of capacity. Air flow may be monitored by a hot wire anemometer or by a positive coefficient thermistor in a balancing circuit which includes a positive coefficient thermistor to compensate for no-flow temperature changes and a negative coefficient thermistor to compensate for full flow temperature changes. Air dew point indicators may also be utilized. All of the various parameters may be utilized to generate signals which are in turn fed to a microprocessor which provides control signals for the system.

While a certain illustrative embodiment of the present invention has been shown in the drawings and described above in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

I claim:

1. A refrigeration system comprising, in combination, an evaporator, means controlling the flow of a liquid refrigerant at a reduced pressure to said evaporator for producing a gaseous refrigerant at a lower pressure and temperature in said evaporator, a compressor for receiving said gaseous refrigerant from said evaporator and compressing said refrigerant to produce a refrigerant at an increased temperature and pressure, a condenser remote from said compressor and evaporator for receiving said refrigerant at increased temperature and pressure and condensing the same to a liquid, a receiver for receiving said condensed liquid refrigerant, means normally supplying said condensed liquid from said receiver to said evaporator flow controlling means, said condenser being subject to low temperatures on the order of about −20° C., a first bypass valve for supplying gaseous refrigerant at said increased pressure and temperature to the interior of said receiver and bypassing said condenser when the pressure in said receiver falls below a predetermined value, and a second bypass valve for supplying gaseous refrigerant at said increased pressure and temperature directly to said evaporator and bypassing said evaporator flow controlling means when the pressure in said evaporator falls below a predetermined value.

2. A refrigeration system as defined in claim 1, wherein said first and said second bypass valves include valve biasing means comprising a pneumatic pressure-biased diaphragm and an opposing coil spring wherein said pneumatic biasing pressure is of a preadjusted value at a given temperature to provide a constant predetermined differential biasing force on said valve at said temperature.

3. A refrigeration system as defined in claim 2, wherein said first bypass valve comprises a flow control valve disk movable into sealing position against one or the other of opposed valve seats, means for supplying liquid refrigerant from said condenser for flow past a first of said seats, means for supplying gaseous refrigerant discharged from said compressor for flow past the second of said seats into said receiver and valve biasing means providing a predetermined constant biasing force for urging said valve disk toward said first seat when the pressure in said receiver is below a predetermined level as determined by the difference between said constant biasing force and the pressure in said receiver and said condenser.

4. A refrigeration system as defined in claim 3, wherein said valve biasing means comprises a final pressure chamber containing an adjusted gas pressure and having a diaphragm applying a force on said valve disk, a coil spring acting on said disk in opposition to the force of said fluid pressure chamber diaphragm, said adjusted gas pressure and said coil spring providing said predetermined constant biasing force on said valve disk at a given temperature, said valve disk moving toward said first seat in response to a positive difference between said biasing force and the force exerted by the pressure in said receiver.

5. A refrigeration system as defined in claim 1, wherein said second bypass valve is provided with a flow control valve disk movable against a valve seat, means for supplying gaseous refrigerant discharged from said compressor for flow past said valve seat and between said valve seat and said valve disk to the inlet line of said evaporator, and fluid pressure biased means for urging said valve disk away from said valve seat when the pressure in said evaporator falls below a predetermined selected value.

6. A refrigeration system as defined in claim 5, wherein said fluid pressure biased means comprises a flexible diaphragm closing a chamber having an adjusted gas pressure therein and acting in opposition to a coil spring to provide a predetermined, constant differential biasing force on said disk at a given temperature.

7. A refrigeration system as defined in claim 1, 2, 3, 4, 5, or 6 wherein said first and second bypass valves are hermetically housed within said receiver for maintaining said valves under the temperature and pressure conditions in said receiver.

8. A refrigeration system as defined in claim 1, 2, 3, 4, 5, or 6 wherein at least one of said first and second bypass valves is hermetically housed with said receiver for maintaining said valve under the temperature and pressure conditions in said receiver.

9. A refrigeration system as defined in claim 1, 2, 3, 4, 5, or 6 further including means for maintaining said first and second bypass valves at a temperature and pressure that is relatively constant with respect to the external ambient temperature and pressure conditions to which the system is subjected.

10. A refrigeration system comprising, in combination, an evaporator, means controlling the flow of a liquid refrigerant at a reduced pressure to said evaporator for producing a gaseous refrigerant at a lower pressure and temperature in said evaporator, a compressor for receiving said gaseous refrigerant from said evaporator and compressing said refrigerant to produce a refrigerant at an increased temperature and pressure, a condenser remote from said compressor and evaporator for receiving said refrigerant at increased temperature and pressure and condensing the same to a liquid, a receiver for receiving said condensed liquid refrigerant, means normally supplying said condensed liquid from said receiver to said evaporator flow controlling means, a first bypass valve for supplying gaseous refrigerant at said increased pressure and temperature to the interior of said receiver and bypassing said condenser when the pressure in said receiver falls below a predetermined value, and a second bypass valve for supplying gaseous refrigerant at said increased pressure and temperature directly to said evaporator and bypassing said evaporator flow controlling means when the pressure in said evaporator falls below a predetermined value, said first and second bypass valves being hermetically housed within said receiver for maintaining said valves under the temperature and pressure conditions in said receiver.

11. A refrigeration system comprising, in combination, an evaporator, means controlling the flow of a liquid refrigerant at a reduced pressure to said evaporator for producing a gaseous refrigerant at a lower pressure and temperature in said evaporator, a compressor for receiving said gaseous refrigerant from said evaporator and compressing said refrigerant to produce a refrigerant at an increased temperature and pressure, a condenser remote from said compressor and evaporator for receiving said refrigerant at increased temperature and pressure and condensing the same to a liquid, a receiver for receiving said condensed liquid refrigerant, means normally supplying said condensed liquid from said receiver to said evaporator flow controlling means, a first bypass valve for supplying gaseous refrigerant at said increased pressure and temperature to the interior of said receiver and bypassing said condenser when the pressure in said receiver falls below a predetermined value, a second bypass valve for supplying gaseous refrigerant at said increased pressure and temperature directly to said evaporator and bypassing said evaporator flow controlling means when the pressure in said evaporator falls below a predetermined value, and means for maintaining said first and second bypass valves at a temperature and pressure that is relatively constant with respect to the external ambient temperature and pressure conditions to which the system is subjected.

* * * * *